Dec. 28, 1937.     H. A. HENSEL     2,103,258
SAUSAGE CASING AND METHOD OF EFFECTING CLOSURE THEREOF
Original Filed May 23, 1936
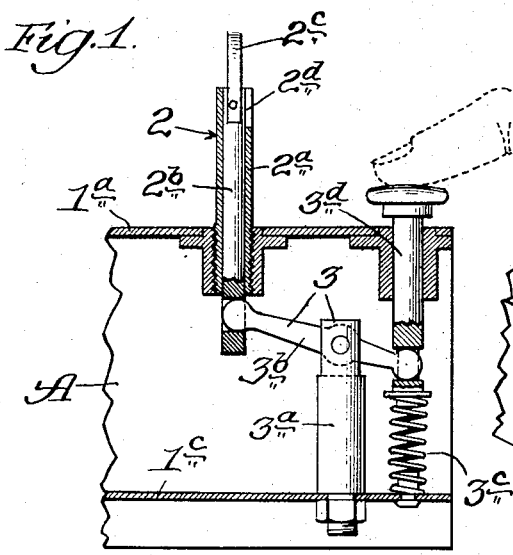
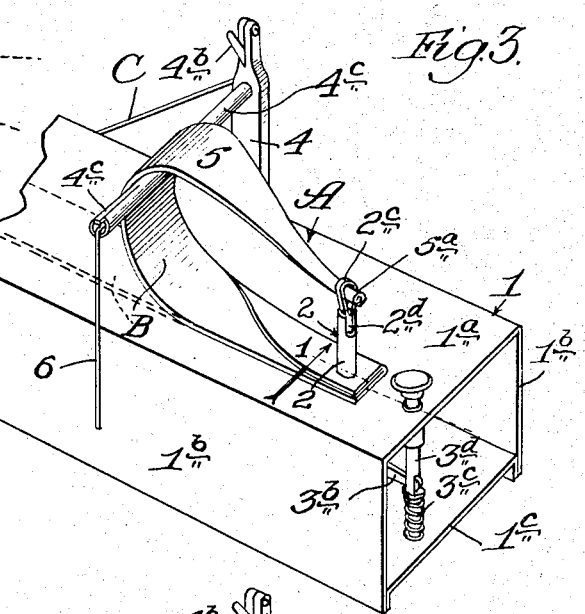
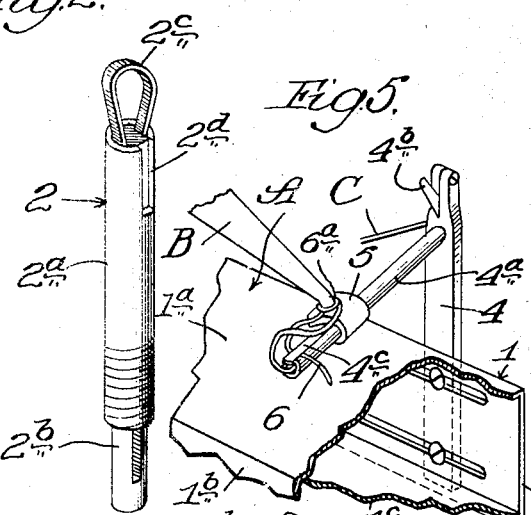
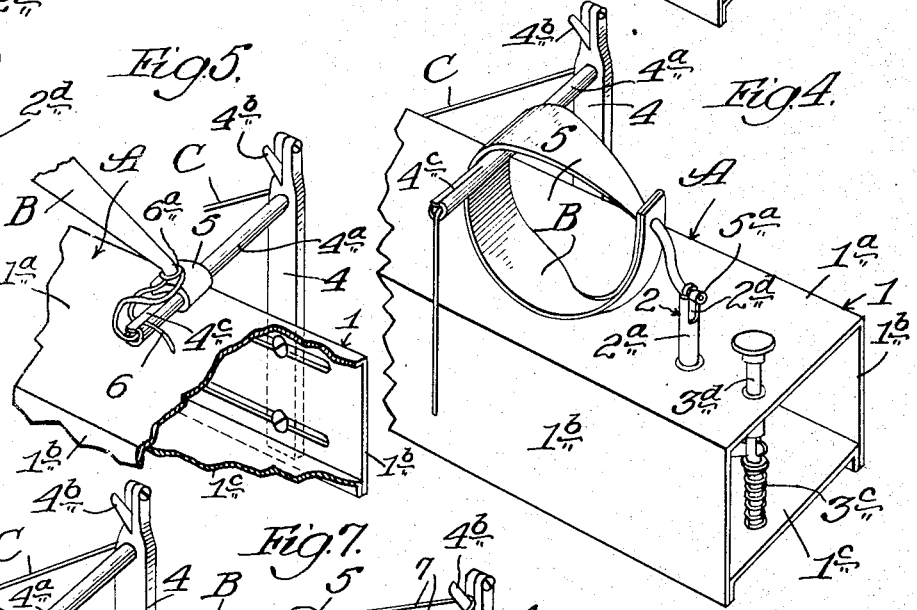
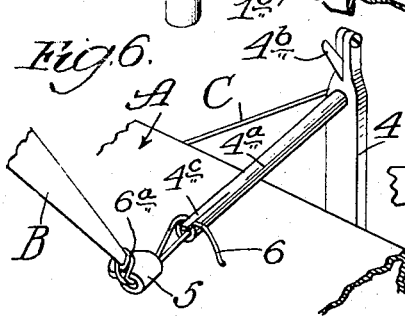
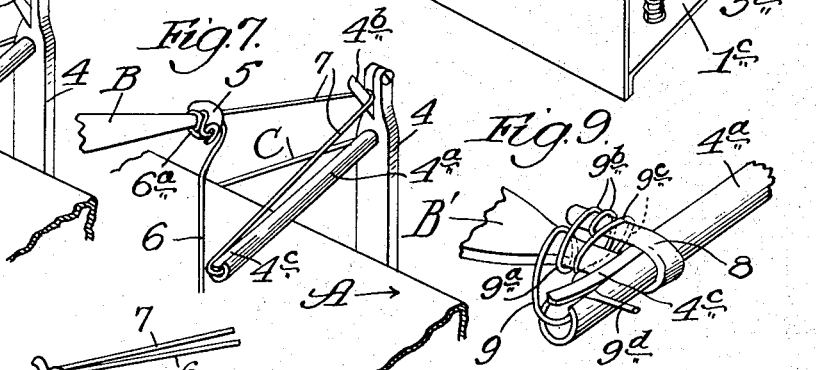
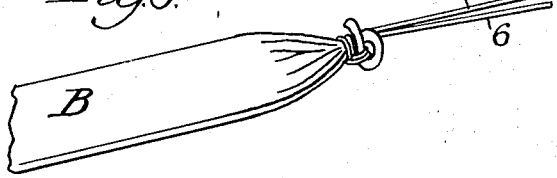
Inventor:
Henry A. Hensel Patented Dec. 28, 1937

2,103,258

UNITED STATES PATENT OFFICE 2,103,258

SAUSAGE CASING AND METHOD OF EFFECTING CLOSURE THEREOF

Henry A. Hensel, Milwaukee, Wis., assignor to The Visking Corporation, Chicago, Ill., a corporation of Virginia Original application May 23, 1936, Serial No. 81,431. Divided and this application October 7, 1936, Serial No. 104,505

5 Claims. (Cl. 99—175)

This invention relates particularly to an improved method of effecting closure of a sausage casing and the improved product resulting therefrom.

The present application constitutes a division of my application Serial No. 81,431, filed May 23, 1936.

In accordance with the present invention, as preferably practiced, one end of the casing is knotted and a separately formed flexible tie, such as a strong cord, is associated with the knot in the casing in such manner that the tie and knot are so interlocked that they serve to reinforce each other. The cord, or tie, serves as a hanger-member by means of which the stuffed sausage may be suspended; and the nature of the engagement of the cord with the knot in the end-portion of the casing is such that the weight of the sausage causes the cord to more effectively grip the knot, so that a highly effective closure of the casing is insured.

The invention is particularly desirable for use in connection with artificial tubular casings, such as regenerated cellulose casings. It may be employed, however, in connection with artificial tubular casings produced in any desirable manner, and such casings may be put to any desired use.

The invention is particularly desirable for use in connection with tubular casings of relatively large diameter, ranging, for example, from 1½" to 4½". Such casings ordinarily are cut to suitable lengths before being stuffed and/or processed. Lengths in common use are from 16" to 24". Whether the casing is to be stuffed with sausage, or other food-stuff, such as a compressed meat-cut or the like, it is desirable to close one end of the casing before the stuffing operation; and it is desirable to provide the closed end of the casing with a hanger. In accordance with the present invention, the cord which forms the hanger is so associated with the closed end of the casing as to tend to more effectively maintain the closure when the weight of the stuffed sausage is sustained by the hanger.

The improved method may be practiced, for convenience, with the aid of a machine of simple construction. The accompanying drawing illustrates such a machine sufficiently to enable the method of effecting the closure of the casing and the resultant product to be readily understood.

In the drawing, Fig. 1 represents a broken longitudinal sectional view, taken as indicated at line 1 of Fig. 3, of a simple machine for enabling the improved closure to be readily effected; Fig. 2, an elevational view on an enlarged scale of the casing-gripper shown in section in Fig. 1; Fig. 3, a broken perspective view of the machine employed, this view showing a sausage-casing having one end perforated and impaled on the device illustrated in Fig. 2 and having the other end entered through a loop-form gripper of said device; Fig. 4, a view similar to Fig. 3, illustrating a further step in knotting the casing; Fig. 5, a broken perspective view, partly in section, showing the loop of the casing drawn closely about a horizontal tubular member through which a tie-cord extends, the tie-cord having been given a turn about the casing and the free end of the tie-cord having been passed beneath a spring-clip; Fig. 6, a broken perspective view, illustrating a further step in which the loop of the casing has been slipped off the tubular supporting member, so that both members of the cord now extend through the casing-loop; Fig. 7, a similar perspective view illustrating the manner in which the cord is drawn a suitable distance through the tubular support and then is passed about a knife by means of which the cord is to be severed; Fig. 8, a broken perspective view of the casing with the knotting completed and the members of the cord ready to be knotted to form a hanger-loop in the cord; and Fig. 9, a broken perspective view illustrating a modification in which looping of one end of the casing is effected and a hanger-cord is effectively used to securely close the casing.

Referring to Figs. 1–8, the machine is designated A; the sausage casing is designated B; and a continuous cord, drawn from any suitable source (not shown) is designated C.

The machine A is illustrated as comprising a hollow sheet metal frame 1 having a top 1$^a$, sides 1$^b$, and a bottom 1$^c$; an impaling and gripping device 2 comprising a tubular member 2$^a$, and a plunger 2$^b$ movable therein and having its upper end equipped with a gripper-loop 2$^c$; a gripper-actuating device 3 comprising a post 3$^a$ carried by the bottom 1$^c$, a lever 3$^b$ pivotally supported on said post, a spring 3$^c$ which normally holds the plunger 2$^b$ pressed, and a finger-actuated plunger 3$^d$ by means of which the lever 3$^b$ may be actuated against the force of its spring, thereby to elevate the gripper-loop 2$^c$ to enable an end-portion of the casing to be thrust therethrough in the manner illustrated in Fig. 3; and a standard 4 secured to a side wall 1$^b$ and carrying a tubular member 4$^a$ which projects across the top 1$^a$ at a suitable distance above the same, one end of the tubular member 4$^a$ passing through the supporting standard 4 and the other end being free.

The casing 1 is of elongated rectangular form. It may be supported upon a bench or table. In Fig. 3, a single sausage casing is illustrated. In practice, a stack of sausage casings, each having one end-portion perforated, will be impaled on the device 2. The operator, taking the casings in succession, will fold the topmost casing about the transverse tubular member 4a and, after suitably reducing the free end, will enter it through the gripper-loop 2c, after elevating the loop in the manner shown in Fig. 1. The casings are preferably softened by soaking in water prior to performing the knotting operation.

The tubular member 2a in which the gripper-plunger works, is suitably mounted in the frame-top 1a, as shown in Fig. 1. At its upper end, the member 2a is provided with a vertical slot 2d, adapted to accommodate the reduced end-portion of the sausage casing when the gripper is lowered to the position shown in Fig. 4.

The lever 3b is supported at an intermediate portion and its ends engage suitable slots with which the plungers 2b and 3d are provided.

The upper portion of the standard 4 is provided with a cutter 4b, shown as struck from the metal of said standard.

Referring to Figs. 1-8, the preferred method of effecting closure of the casing and providing the casing with a hanger-cord so applied that it will, in use, tend to tighten the loop, or knot, in the casing, may be described as follows:

The tubular casing B, in this preferred procedure, has two holes punched therein in transverse alignment, and the perforated end-portion of the casing is folded along the medial longitudinal line to bring the two perforations into registration, after which the casing is impaled upon the device 2 as shown in Fig. 3. In practice, a stack of casings are thus impaled upon the device 2 and supported on the top, or platform, 1a of the machine, the casings having been suitably soaked in water before placing them upon the platform. The casing is folded to form a loop 5 which is supported on the horizontal tubular member 4a through which the cord C extends. The member 4a is provided at its free end with a resilient tongue, or gripper, 4c, the purpose of which will be explained later. The imperforate end-portion of the casing, designated 5a, is reduced in size by rolling or squeezing and is entered in the gripper-loop 2c as shown in Fig 3. This is accomplished while the gripper-loop 2c is in the elevated position shown in Fig. 1. The finger pressure is then removed and the loop 2c is drawn downwardly by the action of the spring 3c, so that the reduced end-portion of the casing is gripped and housed within the upper portion of the tubular member 2a. This permits the perforate end of the casing to be drawn over the reduced end-portion of the casing in the manner shown in Fig. 4. The gripped end of the casing is then released and the loop 5 is reduced to small dimensions, embracing the member 4a as shown in Fig 5.

The cord C has an end-portion 6 which depends from the free end of the tubular member 4a as shown in Fig. 3. This portion of the cord is looped about the casing B back of the casing-loop 5, as indicated at 6a. The end-portion of the cord is then temporarily secured to the end-portion of the tubular member 4a by passing the cord beneath the resilient tongue 4c as shown in Fig. 5. The casing-loop 5 which now embraces the member 4a loosely is slid off the member 4a as illustrated in Fig. 6, the result being that both members of the cord are left extending through the loop 5 of the casing. The interlocking casing-loop and cord-loop are then suitably tightened and the cord is drawn from the tubular member 4a, freeing the end-portion 6 from the gripper 4c and drawing out a sufficient length of the cord to form a loop 7 which is severed over the cutter 4b as shown in Fig. 7.

This leaves the casing in the condition shown in Fig. 8, with the members of the cord extending through the casing-loop 5 and ready to be knotted to form a hanger-loop.

The resilient tongue, or gripper, 4c may be formed in any suitable manner. As shown, it is formed by providing longitudinal slits in the tubular member 4a and lifting the tongue sufficiently to enable the cord to be passed to the gripped position.

It will be noted that the loop 6a of the cord, which may consist of one or two turns about the body of the casing, is disposed back of the perforate end of the casing, or back of the casing-loop 5, so that when the casing is drawn in one direction and the members of the cord drawn in the opposite direction the result will be to tighten the casing-loop. Thus, when a stuffed or loaded casing is being supported by the hanger-loop, the tendency is for the hanger-cord and the casing-loop to mutually tighten and bind upon each other. It is generally known that cellulose sausage casings are, when wet, extremely slippery; hence, the importance of so looping the casing and interlocking the casing-loop with the hanger-cord in such manner that these members will mutually reinforce each other and in such manner that the load in the casing, when the stuffed casing is supported by the hanger-cord, will tend to render more secure the knot in the casing. This feature is important, also, in the operation of stuffing the casing, particularly in sausage stuffing, in which operation high pressure is exerted.

Fig. 9 illustrates a modification, which, while less desirable in some respects, obviates the necessity of perforating one end of the casing. The closure may be effected conveniently by making use of the machine illustrated, omitting the gripper device 2 and attendant parts. In the modification, the casing is designated B'. One end-portion of the casing is compressed or reduced and is folded to form a loop 8 about the mandrel 4a. The cord protruding from the tubular member 4a is designated 9. As clearly appears from Fig. 9, the cord is given a turn about the neck-portion of the main body of the casing, as indicated at 9a. The cord is then given a turn or two about the extremity of the reduced end-portion of the casing, as indicated at 9b. It is then given a turn about the extremity of the reduced portion and the neck-portion of the main body of the casing, as indicated at 9c. Finally, the extremity of the cord, indicated at 9d, is passed beneath the gripper 4c. In the illustration, the parts are shown in loose condition. In practice, the cord will be drawn sufficiently taut to securely connect the free end of the loop to the body of the casing; the casing will then be slid off the mandrel in a manner similar to that indicated at Fig. 6, whereupon both members of the cord will then extend through the casing-loop 8. By suitably tightening the cord enclosing the loop, a secure connection of the hanger-cord with the casing is attained and an effective closure of the casing is also attained.

Cellulosic tubes formed from attenuated long-fibred paper thoroughly impregnated with a cellulose derivative solution, followed by precipitating or regenerating the cellulose derivative, as the case may be, are known on the market. Tubular containers of this character possess great strength. They are amenable to use in accordance with the present invention, as will be understood readily by those skilled in the art.

The foregoing detailed description is given for clearness of understanding only, and no unnecessary limitations should be understood therefrom, but the appended claims should be construed as broadly as permissible in view of the prior art.

What I regard as new and desire to secure by Letters Patent is:

1. The combination of a sausage casing folded upon itself to close the same, and a cord wrapped about said portions adjacent the fold and passed between the folded portions intermediate the wrapped portion of the cord and the fold, whereby tension on the cord tightens the grip of the cord on the casing.

2. A sausage casing having a portion thereof passed through the material of another portion thereof to form a knot, and a cord wrapped around said casing adjacent said knot and passed through said knot whereby tension on said cord tightens the grip of said cord on said casing.

3. A sausage casing having one portion thereof folded upon another portion thereof, and a cord wrapped around said portions and passed between the folded portions intermediate the fold and the wrapped portion of the cord.

4. An artificial casing of the character set forth having near one end a perforation and a loop formed by threading the main portion of the casing through said perforation, and a cord having a loop engaging the casing back of the casing-loop and having a member extending through the casing-loop.

5. An artificial casing having near one end a perforation and a loop formed by threading the main portion of the casing through said perforation, and a hanger-cord having a loop engaged about the casing back of its perforate end adapted to tighten the loop of the casing when the loaded casing is suspended through the medium of said hanger-cord.

HENRY A. HENSEL.